Patented Sept. 14, 1954

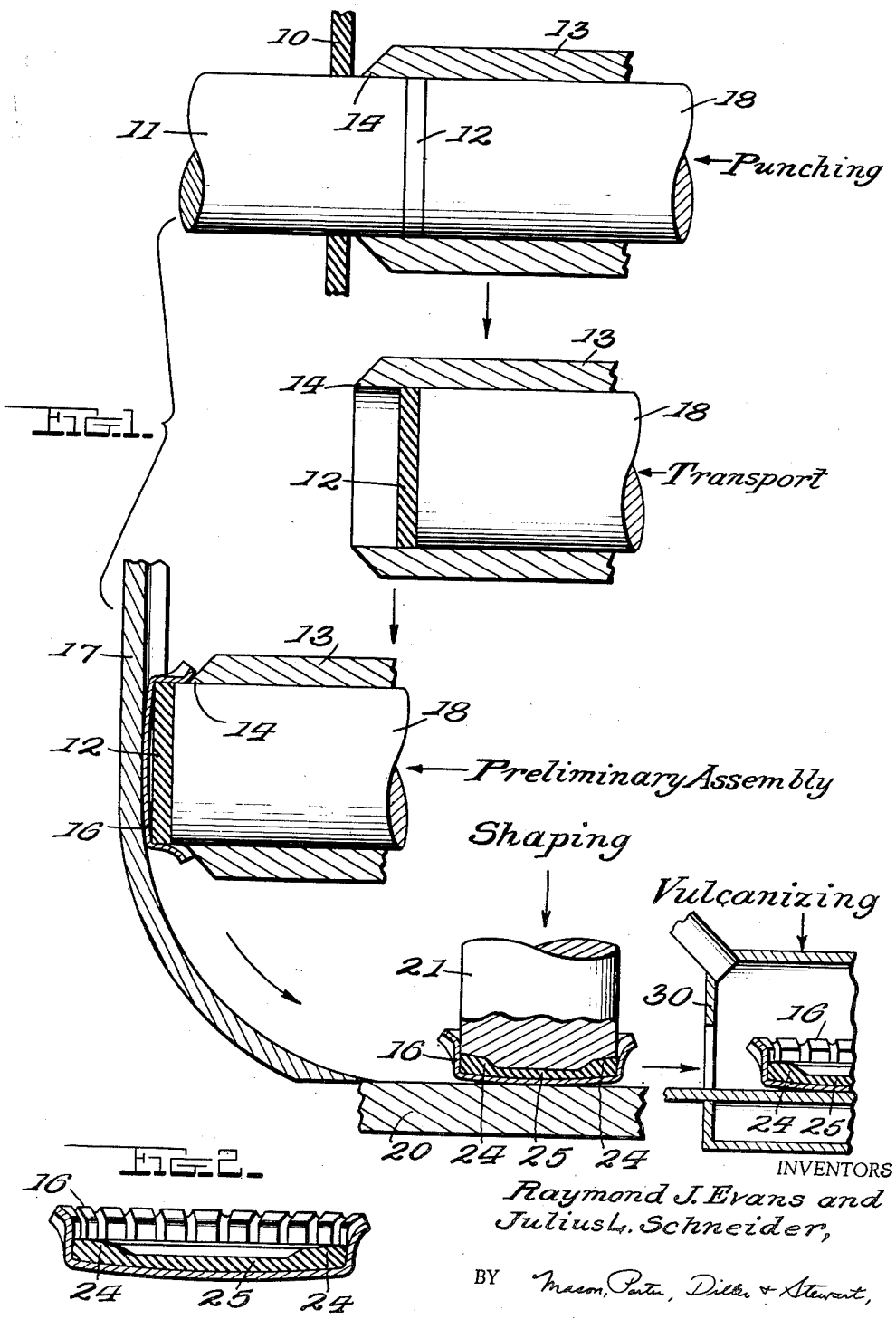

2,688,776

UNITED STATES PATENT OFFICE 2,688,776

ART OF MAKING CLOSURE SEALS

Raymond J. Evans, Des Plaines, and Julius L. Schneider, Chicago, Ill., assignors to Continental Can Company, Inc., New York, N. Y., a corporation of New York Application May 16, 1950, Serial No. 162,239

3 Claims. (Cl. 18—59)

This invention relates to an art of making closure seals having shaped elastic cushion pads of cured material adherent in the shells.

It has been proposed to employ a hot plate to warm a metal crown shell, to place a rubber disk therein, and to apply heat and press by a plunger for shaping the material of said disk and therewith effect adhesion between the material and the metal shell so that the assembly could be removed from the hot plate, allowed to cool, and then used. A difficulty of these operations is that the adhesion is incident to the shaping, so that the heat and pressure must continue to the completion of the shaping, and thus the operation is slow.

According to the present invention, a curable composition is employed to form a blank or disk, which is then subjected to three successive heating operations. Firstly, the cold disk is placed in a heated shell and thereby a primary adhesion effected so that the disk will not be lost or displaced during subsequent handling: this operation can be effected quickly as no extensive heat transfer through the rubbery composition is necessary but only the provoking of a superficial tackiness. Secondly, the disk is heated from both faces, by heating the shell and also heating a shaping plunger which is brought forcefully into displacing contact with the disk; whereby the disk face which later is to be contacted by the lip of the container to be sealed and by the contents thereof, is shaped to correspond to the plunger: this operation can be continued over the necessary time to assure the thermo-plastic flow of the composition into the desired shape, along with an assured contact and adhesion to the inner surface of the crown shell. Finally, the shell with the shaped disk therein is subjected to a curing operation, which can be accomplished in an oven chamber without the need of a shaping die in continuous contact with the exposure face of the disk. Thus the assembly of shell and disk is maintained without separation or displacement and with a most effective employment of the heating and handling facilities.

The attached drawing shows in Figure 1, diagrammatically, the successive steps employed in one example of practice of the invention: and in Figure 2, a sectional view of a completed crown seal.

A cold sheet of vulcanizable rubber composition 10 is punched, for example by the punch 11, to deliver a circular disk 12 into the sleeve 13 which illustratively has an externally conical shape leading to a sharpened edge 14. The sleeve 13 can then be employed as a carrier to transport the disk 12 from the punching station to the preliminary assembly station where a heated metal crown shell 16 is presented by a holder 17 ready to receive the disk 12, which is ejected from the sleeve 13 by the cold plunger 18. The conical exterior of the sleeve 13 assists in the accurate centering and positioning of the disk 12 in the hot shell 16. The cold plunger 18 is employed to hold the disk 12 against the hot shell 16 until heat from the latter has raised parts of the contacting face of the disk to thermo-adhesive condition, wherewith a primary adhesion is accomplished and the plunger 18 can be withdrawn. It will be noted that the relatively low heat transmission of the rubbery composition acts to protect the cold plunger 18 against heating and therewith a sticking to any of the succession of disks 12 upon which it operates; and, in turn, the disk 12 is essentially without permanent deformation as a result of the action of the plunger 18.

When this primary adhesion is effected, the cold plunger 18 is withdrawn and the assembly can be transferred to a hot base plate 20 without fear of separation or displacement. A heated plunger 21 is now presented against the exposure face of the disk 12, so that the disk is now being heated from both sides; that is, by conduction from the crown shell 16 which is being itself heated from the base plate 20, and by conduction from the heated plunger 21. Therewith the rubbery composition is brought to a thermo-plastic condition so that it flows and conforms to the space provided between the crown shell and the heated plunger. In practice, it is preferred to have the composition displaced from the center of the disk toward its periphery; so that the final shape may be as shown in Fig. 2 in which the crown shell 16 has a cushion with a thick periphery 24 to engage the lip of the container, and a thin center 25 for preventing contact of the contents of the container with the metal crown shell.

The heat and pressure effects of the hot base plate 20 and the heated plunger 21 are continued until the final shaping has been accomplished: and it will be noted that the flow and displacement of the composition during this time is controlled by the conjoint action of the crown shell and of the heated plunger so that the material is enclosed against undesirable displacement, without original requirement that the plunger 21 shall provide for the proper centering of the disk 12 in the crown shell. The heated plunger 21 may be lubricated, after each shaping operation or after a number of such operations, with an anti-adhesion lubricant, as known in the art.

When shaping is completed, the heated plunger 21 is withdrawn, and the crown shell with its shaped cushion pad is moved into the air heated oven chamber 30 in which it is heated for a time and at a temperature for effecting the curing or vulcanizing of the composition.

A feature of the steps of operation is that each may be suspended at any time without rendering the entire operation worthless. Thus, the cold sleeve 13 can hold the cold disk for a long time without trouble: and the heat in the crown shell presented with a disk 12 by the action of the cold plunger 18 can produce tackiness and the primary adhesion without excessively heating adjacent structures. After primary adhesion is assured, the assembly of crown shell and cushion pad can be handled as a unit. After the shaping by the heated plunger 21, it is unnecessary to maintain a mold in contact with the pad during the vulcanizing treatment: but its closure face can be directly exposed to the heated air in the oven.

A suitable rubbery composition can comprise rubber, fillers, lubricant, and vulcanization agents. An illustrative formulation is:

|  | Parts by weight |
|---|---|
| Crepe rubber (natural latex rubber) | 88 |
| Semi-solid isobutylene polymer | 12 |
| Hydrated precipitated calcium silicate | 63 |
| Clay | 65 |
| Zinc oxide | 5 |
| Stearic acid | 2 |
| Heptylated diphenylamine | 1 |
| Dipentamethylene thiuram tetrasulfide | 1 |
| Tetramethyl thiuram monosulfide | 1½ |
|  | 238½ |

The crepe rubber is worked on a rubber mill, with the rolls heated by steam to about 150° F. until plastic or "broken down." The plasticizer (isobutylene polymer above) is added and thoroughly incorporated by continued milling. The anti-oxidant (substituted diphenylamine above), pigments and fillers (zinc oxide, clay and silicate above), lubricant waxy material (stearic acid above), and vulcanizing agent (the tetrasulfide above as source of available sulfur, and the monosulfide as activator or secondary agent) are then added and incorporated during the milling, the rolls being gradually separated as these are added. After thorough incorporation, the batch is sheeted out at the desired thickness, cooled, and wrapped in cellophane, Holland cloth, or like sheeting for storage and handling. This processing is a normal one in the rubber industry and no claim is made herein to the same as an independent invention. The materials and quantities for providing a thermo-adhesive and thermo-plastic curable composition, which is elastic when cured, can be varied in ways known to the expert in the art; it being preferred where a rubber-based seal is to close a vessel containing a foodstuff or other article where freedom from off-door or off-taste is required, that no elemental sulfur be introduced, but that the sulfur be present in a combined form which yields sulfur upon demand of the mixture during the curing operation. Other compositions can be employed, as will be understood by the expert in the vulcanizable rubber arts.

The crown shell in holder 17 can be pre-heated to 150–200° F.; and the cold plunger 18 can hold the disk 12 in contact therewith for a fraction of a second up to two seconds at a pressure of, say, 5 to 10 pounds per square inch for the area of the plunger. The composition of disk 12 can be heated to 250° to 325° F. by the hot base plate 20 and heated plunger 21 for about 6 to 30 seconds at a pressure of 150 to 750 pounds per square inch. The curing oven can effect the vulcanization at temperatures of 225° to 300° F. for a time of 45 minutes to 5 minutes (the time and temperature varying inversely), dependent on oven air velocity: for example, 10 minutes at 300° F. has been found satisfactory.

Under such illustrative conditions, the crown seal of Figure 2 has a center 25 with a thickness of five to ten thousandths of an inch, and an annular ring 24 with a thickness of twenty to thirty-five thousandths of an inch.

The feature of cutting the blanks as disks 12 from an uncured but vulcanizable sheet 10 of rubbery composition permits the recovery of the scrap by simple re-rolling on a rubber mill to produce a further sheet of like thickness; from time to time introducing a further mass of the composition to the rolls of the mill. Thus the total operation is essentially without waste, as the composition is not heated until the disk 12 is in contact with the shell 16 to which it is to adhere.

It is obvious that the invention is not restricted to the specific conditions stated, but that it may be employed with equivalent materials and conditions, as known to those skilled in the vulcanizable rubber arts, without departing from the scope of the appended claims.

We claim:

1. The process of making a closure seal which comprises cutting a disk in the cold from a sheet of thermoadhesive and thermo-plastic curable composition which is elastic when cured, transporting the disk to a preliminary assembly station, heating a closure shell and presenting the same at the preliminary assembly station, pressing the cold disk against the heated closure shell by a cold element and thereby provoking a softening and thermo-adhesiveness only at the contacting face of the disk with the closure shell and producing a primary adhesion of the disk to the shell, removing the cold element from the disk prior to significant heating thereof, transferring the shell with the disk adhering thereto to a heated support with the outer face of the shell in contact with the support, pressing a heated shaping plunger against the disk while heating the shell and the disk therein whereby to cause the composition to flow under pressure and thereby reshaping the disk of composition material in the shell, withdrawing the shaping plunger, and thereafter heating the shell and the reshaped composition adherent therein in a current of hot air and with the exposure face of the composition exposed to the air for a time and at a temperature competent to effect curing of the composition.

2. The process of making a closure seal having a cushion pad of vulcanized rubber composition and a closure shell, which comprises heating the closure shell to a temperature at which the composition is tacky, cutting a disk in the cold from a sheet of vulcanizable rubber composition at a cutting zone remote from the heated closure shell, transporting the disk while maintaining it cold from the cutting zone to a zone of primary adhesion, pressing the cold disk against the heated closure shell in said primary adhesion zone by a cold element and thereby provoking a softening and thermo-adhesiveness only at the contacting face of the disk with the shell and producing primary adhesion of the disk to the shell, removing the cold element from the disk prior to significant heating of the element and prior to significant permanent deformation of the disk, shifting the assembly of the shell with the disk adherent thereto from the zone of primary adhesion to a heated shaping zone, thereafter pressing a shaping plunger against the disk in the shaping zone while heating the assembly of the shell and the disk therein to a temperature permitting the rubber composition to flow under the pressure and thereby reshaping the disk of composition material in the shell, withdrawing the shaping plunger, shifting the assembly of shell and reshaped composition to a vulcanizing zone, and heating the assembly in the vulcanizing zone for effecting vulcanization of the composition.

3. The process of making a closure seal having a cushion pad of vulcanized rubber composition and a closure shell, which comprises heating the closure shell to a temperature at which the composition is tacky, cutting a disk in the cold from a sheet of vulcanizable rubber composition at a cutting zone remote from the heated closure shell, transporting the disk while maintaining it cold from the cutting zone to a zone of primary adhesion, pressing the cold disk against the heated closure shell in said primary adhesion zone and thereby provoking a softening and thermo-adhesiveness only at the contacting face of the disk with the shell and producing primary adhesion of the disk to the shell, shifting the assembly of the shell with the disk adherent thereto from the zone of primary adhesion to a heated shaping zone, thereafter pressing a heated shaping plunger against the disk in the shaping zone while heating the assembly of the shell and the disk therein to a temperature permitting the rubber composition to flow under the pressure and thereby reshaping the disk of composition material in the shell, withdrawing the shaping plunger, shifting the assembly of shell and reshaped composition to a vulcanizing zone, and heating the assembly in the vulcanizing zone for effecting vulcanization of the composition.

References Cited in the file of this patent

UNITED STATES PATENTS

| Number | Name | Date |
| --- | --- | --- |
| 1,486,937 | Taliaferro | Mar. 18, 1924 |
| 1,872,046 | Teague | Aug. 16, 1932 |
| 1,996,048 | Madina | Mar. 26, 1935 |
| 2,548,303 | Gora | Apr. 10, 1951 |
| 2,548,305 | Gora | Apr. 10, 1951 |